(12) United States Patent
Liu

(10) Patent No.: US 6,318,652 B1
(45) Date of Patent: Nov. 20, 2001

(54) GRATER

(76) Inventor: Ming-Chien Liu, No. 53, Shin Shin St., Tatu Hsiang Taichung Hsien (TW)

( * ) Notice: Subject to any disclaimer, the term of this patent is extended or adjusted under 35 U.S.C. 154(b) by 0 days.

(21) Appl. No.: 09/741,512

(22) Filed: Dec. 19, 2000

(51) Int. Cl.[7] .............................. A23L 1/00; A47J 43/00; A47J 43/25; A47J 43/28; B02C 19/20
(52) U.S. Cl. ..................... 241/95; 241/168; 241/273.1; D7/678; 99/510
(58) Field of Search ................ 99/495, 510; 241/93, 241/95, 168, 273.1, 273.2, 273.3, 37.5, 101.01, 101.2; D7/678

(56) References Cited

U.S. PATENT DOCUMENTS

| | | | |
|---|---|---|---|
| D. 334,875 | * 4/1993 | Behnke | D7/678 |
| D. 378,336 | * 3/1997 | Pedrini | D7/678 |
| 2,225,658 | * 12/1940 | Rauchfuss | 241/37.5 |
| 2,271,175 | * 1/1942 | Mantelet | 99/510 X |
| 2,405,056 | * 7/1946 | Rosenbloom | 241/273.1 |
| 2,690,307 | * 9/1954 | Mantelet | 241/168 |
| 2,804,896 | * 9/1957 | Silberberg | 99/510 X |
| 3,589,421 | * 6/1971 | Locker | 99/510 X |
| 3,642,045 | * 2/1972 | Buvelot | 99/495 X |
| 4,037,793 | * 7/1977 | Puustinen | 241/95 X |
| 5,364,037 | * 11/1994 | Bigelow | 241/273.3 X |
| 5,660,341 | * 8/1997 | Perkins et al. | 99/510 X |
| 5,702,061 | * 12/1997 | Kennedy et al. | 241/273.3 X |

\* cited by examiner

*Primary Examiner*—Timothy F. Simone
(74) *Attorney, Agent, or Firm*—William E. Pelton, Esq.

(57) ABSTRACT

A grater according to the present invention has a frame and a blade attached to the frame. The frame has a handle extended from a short side of the frame. A recess is defined in an inner part of the hollow of the frame near the handle such that the blade can be removed easily from the frame. The blade has a contiguous side wall extending downward and the side wall mates with an opening defined in the frame. As the grater has changeable blades, it is possible to deal with various vegetables and fruits by selection of the suitable blade, whereby effectiveness and convenience in using the grater are achieved.

2 Claims, 5 Drawing Sheets

GRATER

BACKGROUND OF THE INVENTION

1. Field of the Invention

The present invention relates to a grater, and more particularly to a grater having changeable cutting blades by which it is possible to cut various vegetables and fruits in a range of thicknesses etc by selecting a suitable one of the cutting blades.

2. Description of the Prior Art

A conventional grater mainly comprises a frame and a cutting blade, and the blade is firmly set on the frame. The grater has only a single function such that a user must prepare various graters to shave strips, slices, and small particles, according to needs, and having all the graters occupies too much cupboard space. This waste of space is aggravated by the fact that unlike knives for example, graters are not commonly used everyday.

SUMMARY OF THE INVENTION

A first objective of the present invention is to provide a grater having changeable blades whereby a minimum of storage space is required by the grater.

A second objective of the present invention is to provide a grater having various blades, wherein only appropriate blades need be bought according to the needs of consumers, whereby the grater is inexpensive and efficiently used.

DETAILED DESCRIPTION OF THE PREFERRED EMBODIMENT

A grater according to the present invention comprises a frame (10) and a blade (20) attached to the frame (10).

Figure 1:
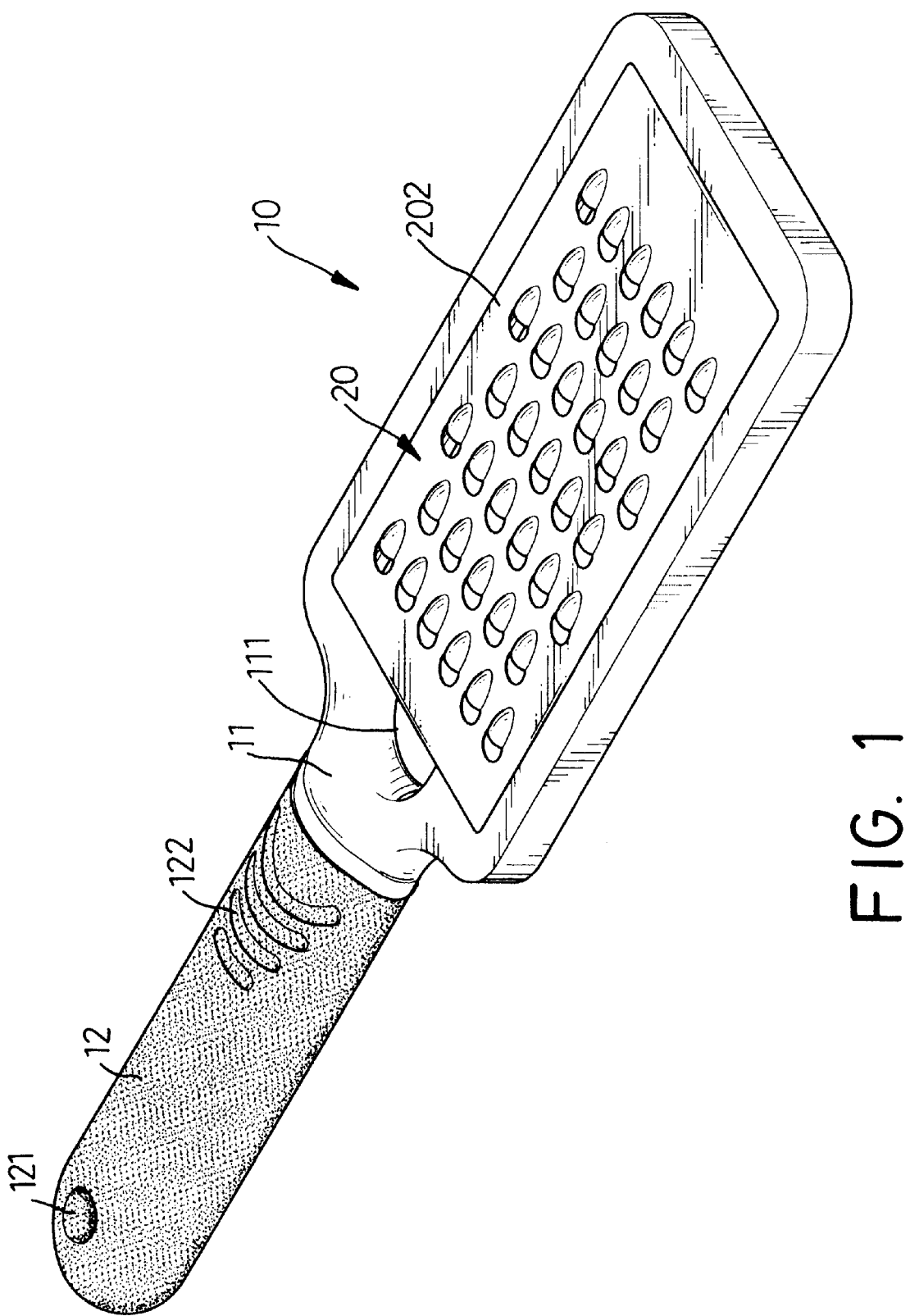
FIG. 1 is a perspective view of a grater in accordance with the present invention.
Figure 2:
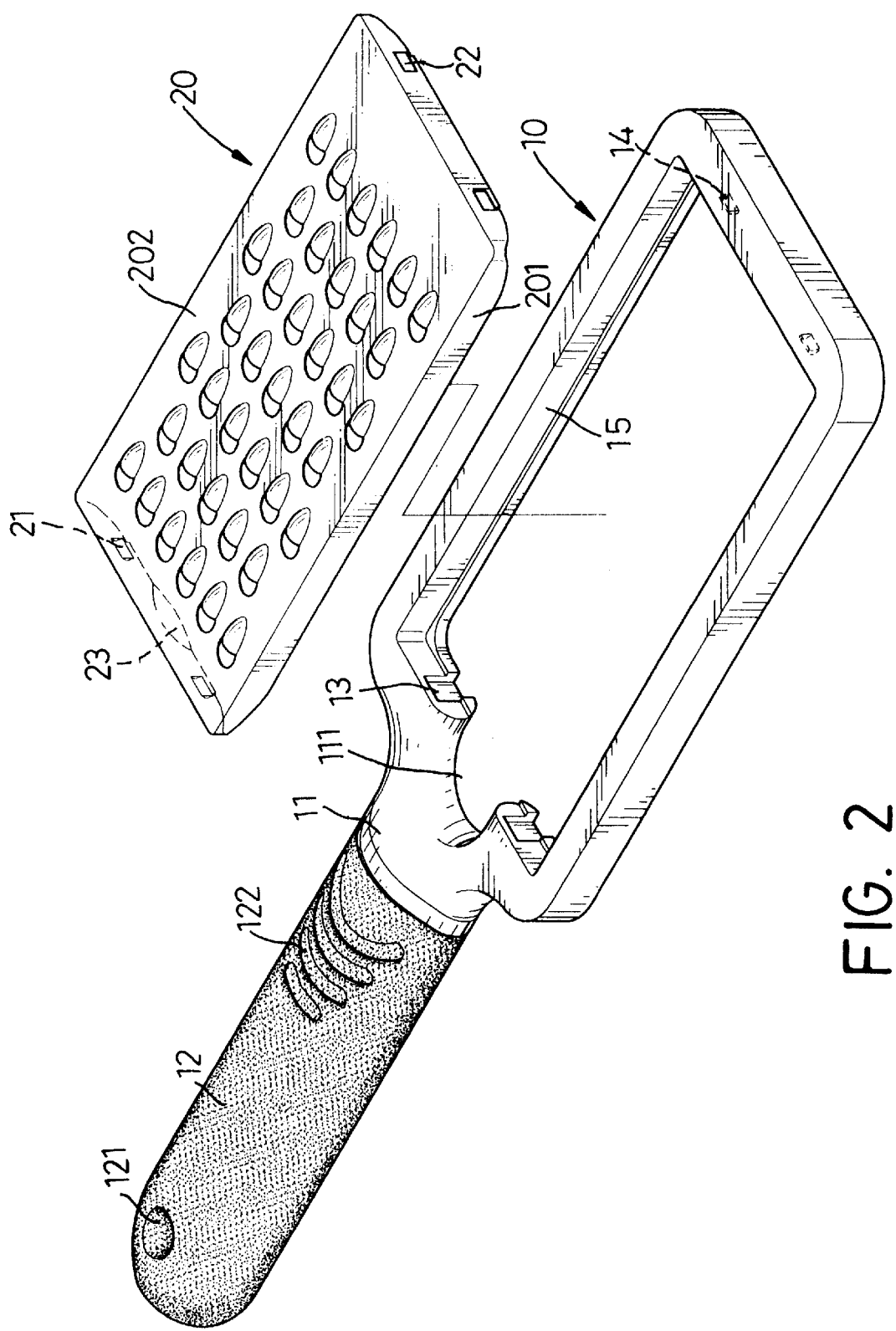
FIG. 2 is an exploded view of the grater in accordance with the present invention.

Referring to the figures and in particular FIGS. 1 and 2, the frame (10) is substantially rectangular and defines a central opening (102). A peripheral flange (15) is formed at an inner edge defining the opening (102) of the frame (10). A handle (11) has a first end extended from a short side of the frame (10) and a distal second end. A recess (111) is defined in the first end of the handle (11), and the recess (111) communicates with the opening (102). An anti-slip cover (12) is securely fitted over the handle (11) to provide a good grip for a user. A plurality of ribs (122) is formed on the anti-slip cover (12) and near the opening of the frame (10) to increase the grip of a user. A first hole (121) is defined in the cover (12) at the second end of the handle (11), whereby to the grater can be easily hung on a wall or a cupboard. Two dents (13) are defined in the frame (10) and on either side of the recess (111). The other short side of the frame (10) has at least one boss (14) formed thereon. In the preferred embodiment of the present invention, two bosses (14) are formed on the respective short side of the frame (10).

The blade (20) is made of thin pressed steel and has a working-surface (202) with a contiguous side wall (201) extended downward therefrom. The side wall (201) includes two opposed short walls and two opposed long walls. The blade(20) is configured to be snugly received in the opening (102) of the frame (10) with the working-surface (202) being uppermost, and a bottom face of the side wall (201) resting on a top face of the flange (15). The working-surface (202) is flush with a top surface of the frame (10). Two second holes (22) are defined in a first of the short walls of the side wall (201) and correspond to the bosses (14). Two buttons (21) are formed in the second short wall and correspond to the dents (13). A convex part (23) is formed on side wall of the blade (20) and between the two buttons (21). The convex part (23) provides purchase for a user's finger.

Figure 3:
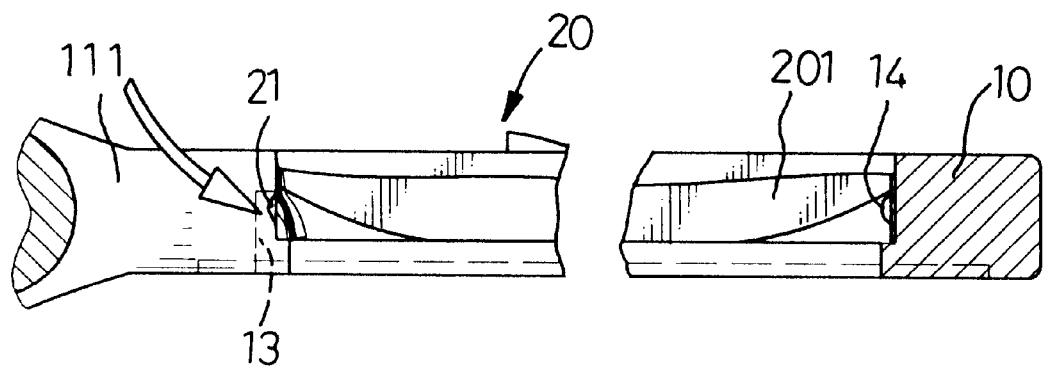
FIG. 3 is a schematic partial view of the grater in accordance with the present invention.
Figure 4:
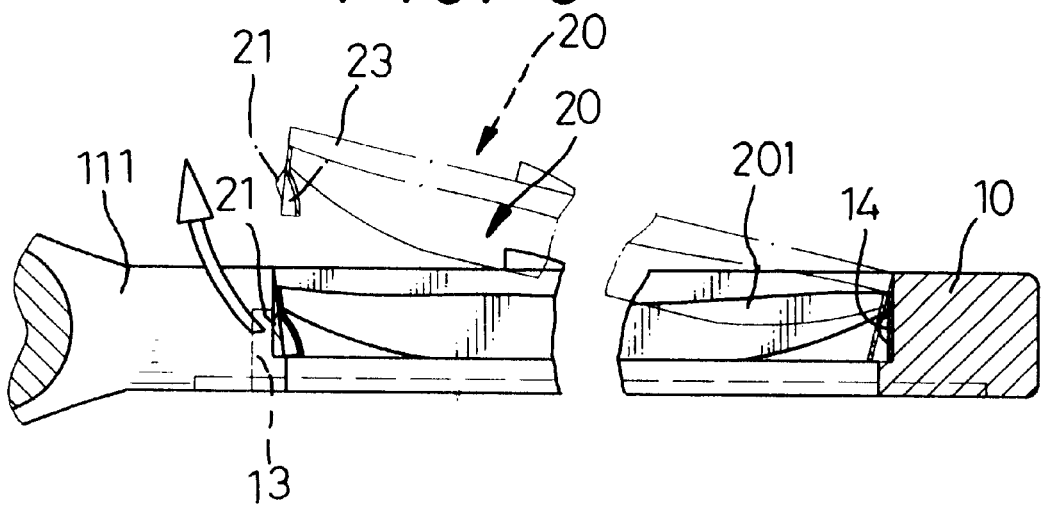
FIG. 4 is a schematic partial view of the grater in accordance with the present invention.

In use, as shown in FIGS. 3 and 4, a user inserts a finger (as shown by the arrow) first into the recess (111) and second, under the convex part (23) to lift up the blade (20) from the frame (10). As the blade (20) is made of thin steel plate, it temporarily deforms to make the buttons (21) release from the dents (13) whereafter the bosses (14) separate from the second holes (22) such that the blade (20) is easily removable from the frame (10). To fit another blade (20) into the frame (10), a user first locates the bosses (14) respectively in the second holes (22), and then presses the convex part (23) inward toward the first short wall and finally lowers the blade (20) completely into the opening (102), whereafter the buttons (21) are snappingly received in the dents (13) by recovery force of the blade (20). Thus the blades (20) are fitted in the frame (10) so that a user can then shave, grate, slice etc vegetables and fruits.

Figure 5:
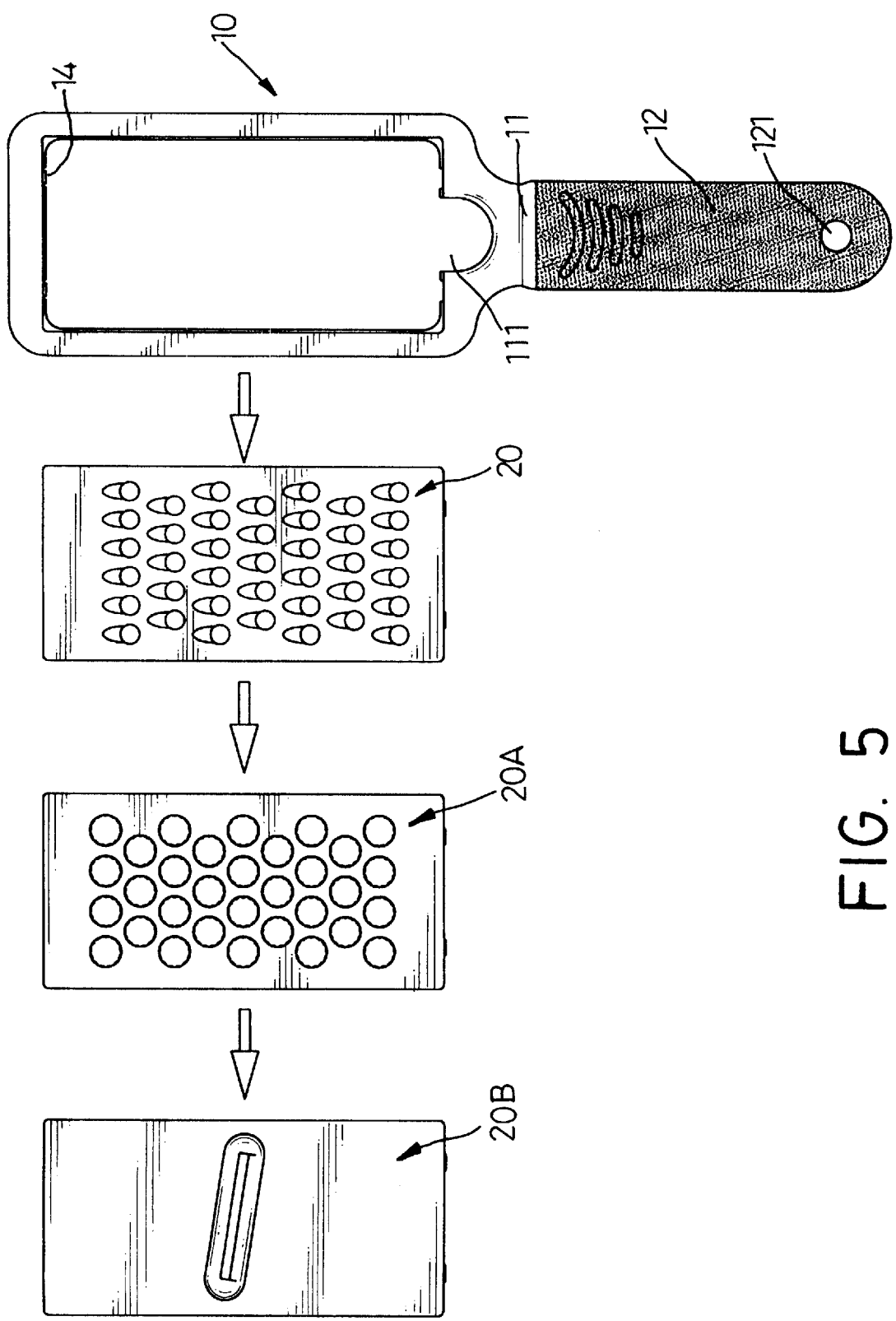
FIG. 5 is a plane view of a grater with different boards in accordance with the present invention.
Figure 6:
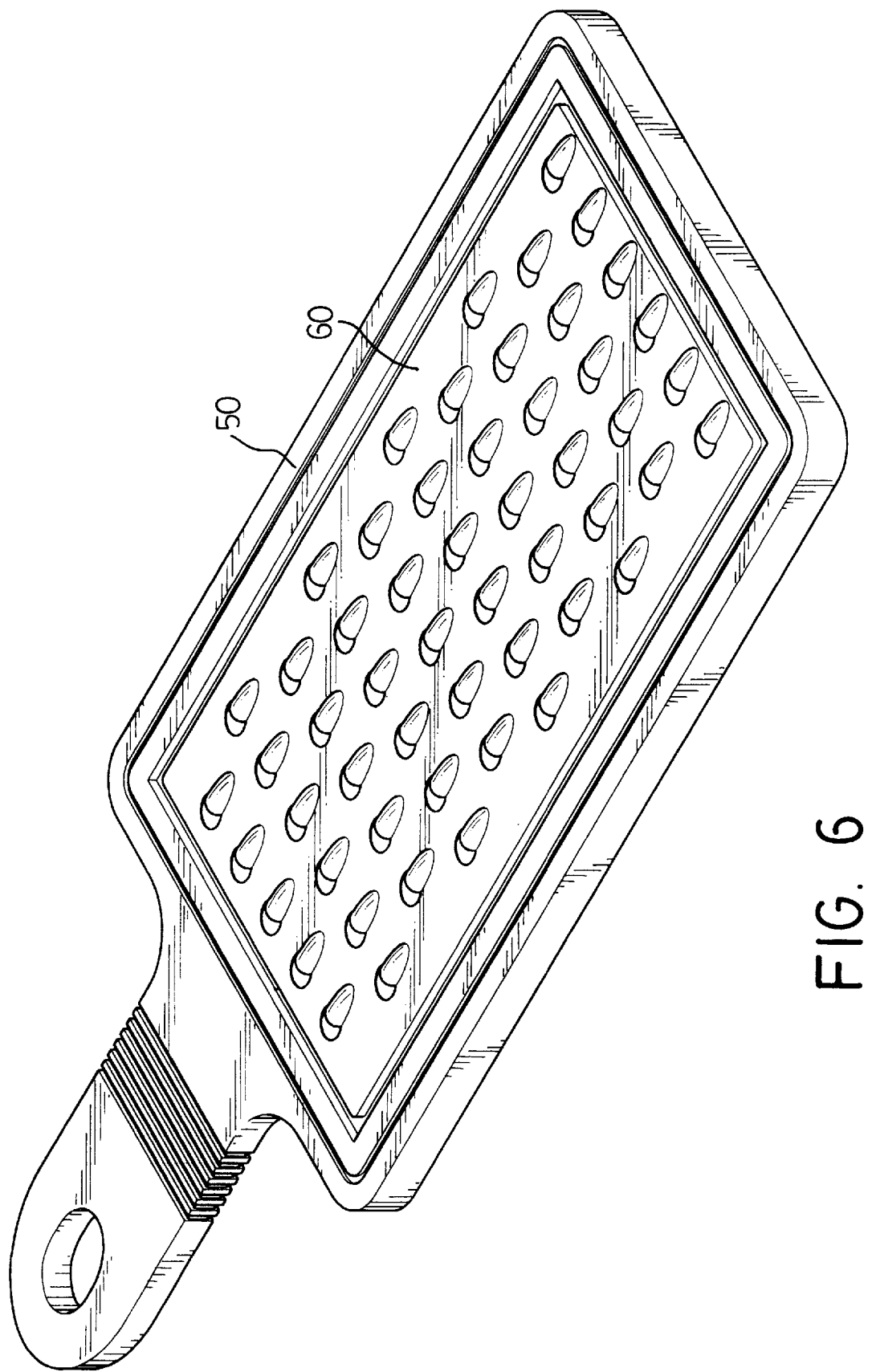
FIG. 6 is a perspective view of a conventional grater.

The blade (20) of the present invention, as shown in FIG. 5, is designed to incorporate different types of cutting styles. For instance, the blade (20) shaves vegetables and fruits to a silk-like composition, a blade (20A) grinds vegetables and fruits to mash, and a blade (20B) shaves vegetables and fruits as slices. The embodiment of the present invention has been described in detail to the features and structure thereof; it is apparent that the present invention has shown the improvement thereof, which is never anticipated and accomplished by others so far; the structure of the present invention is deemed unique.

What is claimed is:

1. A grater comprising:

a frame with a handle extended therefrom, an opening defined therein, and a recess defined therein and near the handle and in communication with the opening, wherein the opening has two opposed long side and two opposed short sides, and at least one dent is formed in one of the short sides and the at least one boss is formed in the other of the short sides;

at least one cutting blade receivable in the opening of the frame and having engagement means for releasably securing the cutting blade, and the cutting blade comprising a top sheet and a contiguous side wall extended downward from a periphery of the top sheet, wherein the contiguous side wall of the cutting blade comprises two short walls and two long walls corresponding to the short and long sides of the opening of the frame, and the engagement means of the cutting blade is at least one hole defined in a first of the short walls and corresponding to the at least one boss of the opening of the frame, and at least one button formed in the second of the short walls and corresponding to the at least one dent of the opening.

2. The grater as claimed in claim 1, wherein the convex part is formed on the side wall of the blade to provide purchase for a user's finger.

* * * * *